US007978246B2

(12) United States Patent
Osann, Jr. et al.

(10) Patent No.: US 7,978,246 B2
(45) Date of Patent: Jul. 12, 2011

(54) ELECTRONIC MIRROR

(76) Inventors: Robert Osann, Jr., Cupertino, CA (US); Mary M. Fasching, Cupertino, CA (US)

( * ) Notice: Subject to any disclaimer, the term of this patent is extended or adjusted under 35 U.S.C. 154(b) by 728 days.

(21) Appl. No.: 12/075,516

(22) Filed: Mar. 11, 2008

(65) Prior Publication Data

US 2008/0225123 A1   Sep. 18, 2008

Related U.S. Application Data

(60) Provisional application No. 60/906,755, filed on Mar. 13, 2007.

(51) Int. Cl.
*H04N 5/222* (2006.01)
*H04N 5/225* (2006.01)
*H04N 7/18* (2006.01)

(52) U.S. Cl. .................... 348/333.01; 348/373; 348/77
(58) Field of Classification Search ............... 348/77, 348/333.01, 373–376
See application file for complete search history.

(56) References Cited

U.S. PATENT DOCUMENTS

| | | | | |
|---|---|---|---|---|
| 2004/0204093 | A1* | 10/2004 | Imaeda | 455/558 |
| 2007/0040033 | A1* | 2/2007 | Rosenberg | 235/462.36 |
| 2007/0182819 | A1* | 8/2007 | Monroe | 348/143 |
| 2007/0273675 | A1* | 11/2007 | Wangler | 345/204 |

* cited by examiner

*Primary Examiner* — Timothy J Henn

(57) ABSTRACT

An Electronic Mirror is described that can capture and display, using a digital/video camera or cameras, the image of a subject as they look when viewing themselves in a mirror. The captured image is displayed on a video monitor or TV set. A widescreen flat panel monitor is utilized, having the ability to physically rotate 90°. In portrait mode the monitor functions as an Electronic Mirror, and in landscape mode is capable of functioning as a conventional TV set or video monitor. Rotation is either manual or motorized. Captured images of a subject may be split such that a portion reflecting one type of outfit may be combined with a portion reflecting a different outfit, thus electronically creating a combination of clothing that may never have been actually worn. Video capture may also be supported enabling a subject to capture and display a 360 degree view as they turn around.

7 Claims, 4 Drawing Sheets

ELECTRONIC MIRROR

CLAIM OF PRIORITY

This application claims the benefit and priority of U.S. Provisional Application Ser. No. 60/906,755, filed on Mar. 13, 2007, and entitled "ELECTRONIC MIRROR," by inventors Robert Osann, Jr. and Mary M. Fasching, commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to Flat-Screen Video Monitors and Television Sets, as well as digital/video cameras, remote controls, computers and computer networks, and software for image processing and manipulation.

BACKGROUND

In order to feel properly dressed for business or social situations, many people find that they try on multiple items of clothing, in different combinations, before they find the particular combination they feel most comfortable wearing on a particular day. This process of taking items of clothing on and off is especially time-consuming and, when one is pressed for time prior to an event or the start of a workday, can make life especially frustrating. It is therefore especially useful to introduce a method for recording and viewing a person's clothing ensemble using electronic methods in order to reduce the time they spend in choosing a particular ensemble on a particular day.

SUMMARY

One object of this invention is to record, using a digital/video camera or multiple cameras, the image of a person or subject as they would normally look when viewing themselves in a mirror. This image is subsequently shown to them on a flat panel video monitor or TV set. All functions are controlled by either a handheld remote control or by a voice recognition remote control mechanism. Captured images may be stored for viewing at a later time.

Another object of this invention is that a widescreen flat panel monitor is utilized, having the ability to be physically rotated 90°, whereby when oriented in portrait mode it functions as an Electronic Mirror, and when oriented in landscape mode is also capable of functioning as a conventional TV set or monitor. The rotation of the monitor may be either manual or motorized and if motorized, may be controlled by remote control. The invention may include an integral TV tuner or satellite/cable receiver, or alternately may simply receive TV programming via video and audio inputs driven by a separate TV receiving device.

Another object of this invention is that images may be saved either within the invention itself or on a storage device somewhere on a local area network or the Internet for later retrieval by way of a network connection.

Another object of this invention is that the image of a person may be split in some manner such that portions of an image reflecting one type of outfit may be combined with a different portion of another type of outfit, thus electronically creating a combination of clothing that may be shown to a person for review although this particular combination of clothing may never have been actually worn by the person at any particular moment in time. This may include the ability to overlay stock images of different jewelry items or other accessory items such as shoes on top of images of the subject when wearing different clothing ensemble combinations. The image of a person may be split into more than two portions. For instance, the image may be split at the beltline and again at the ankles and neck, so that different combinations of tops, bottoms, shoes, and hairstyle may be intermixed during a review session.

Another object of this invention is to include a camera capable not only of digital still images but also capable of capturing full motion video such that a person may record a sequence of events such as rotating their body 360° in order to view their combination of clothing and hair style from different angles not normally visible with a conventional mirror. This video may then be viewed on the same monitor immediately after recording, or at a later time.

Another object of this invention is to include an alternate mode of operation where all images captured by the digital camera are displayed on the flat panel monitor in realtime similar to the operation of a conventional mirror, as opposed to being captured under control of a remote control command. This mode of operation is similar to that of closed-circuit TV (CCTV).

Another object of this invention is that captured images, and composite images resulting from merged portions of images and overlayed stock images, may be shared with others via the Internet such that others may comment on a particular outfit combination. This may be accomplished by emailing images, or by establishing an image exchange website wherein a specific user may deposit images in a protected area such that other persons who have been given permission by that specific user may remotely access these deposited images, and messages relating to the images may be passed between the specific user and other persons. The other persons viewing the images remotely may view them on any computer with Internet access capability, or alternately may view them on a second (remote) Electronic Mirror per this invention.

DETAILED DESCRIPTION OF THE INVENTION

Figure 1:
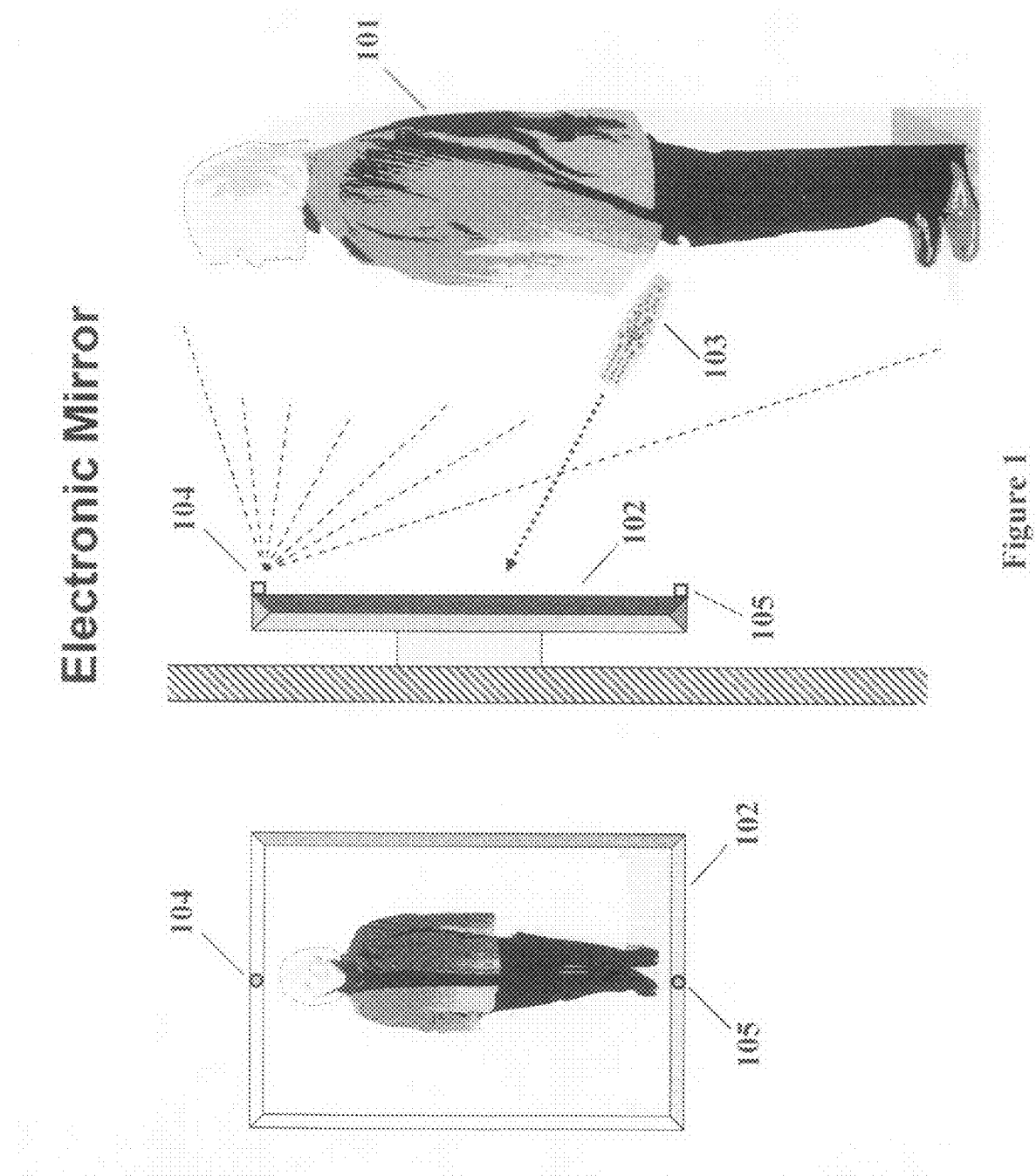
FIG. 1 shows both a profile and frontal view of a subject and an Electronic Mirror per this invention.

FIG. 1 shows a profile view of a person 101 standing in front of an Electronic Mirror 102 according to this invention, in this instance using a handheld remote control 103 to control the Electronic Mirror 102. Both profile and frontal views of Electronic Mirror 102 are shown. This handheld remote control could either be of the infrared variety or a wireless remote control. Alternately, remote control could be accomplished to voice commands combined with voice recognition capability in the Electronic Mirror. In FIG. 1 the Electronic Mirror is shown in a portrait style mode and contains at least one digital camera 104 where the optics of a single camera are set for a degree of wide angle that captures the entire image of the subject from head to toe just as a conventional full-body mirror would display. If only one camera is utilized, the preferred camera position may be either at the top or bottom of the Electronic Mirror, depending on the height of the subject and the height of the mirror relative to the floor. For instance, for the scenario shown in FIG. 1, the preferred location for a single camera might be at the bottom of the Electronic Mirror as shown for camera location 105. It is also possible to include additional image processing software within the Electronic Mirror or on a processor connected to the electronic Mirror via a network, such that images captured using a camera or cameras having wide angle lenses may be altered to remove some or all of the distortion produced by a wide angle lens.

Figure 2:
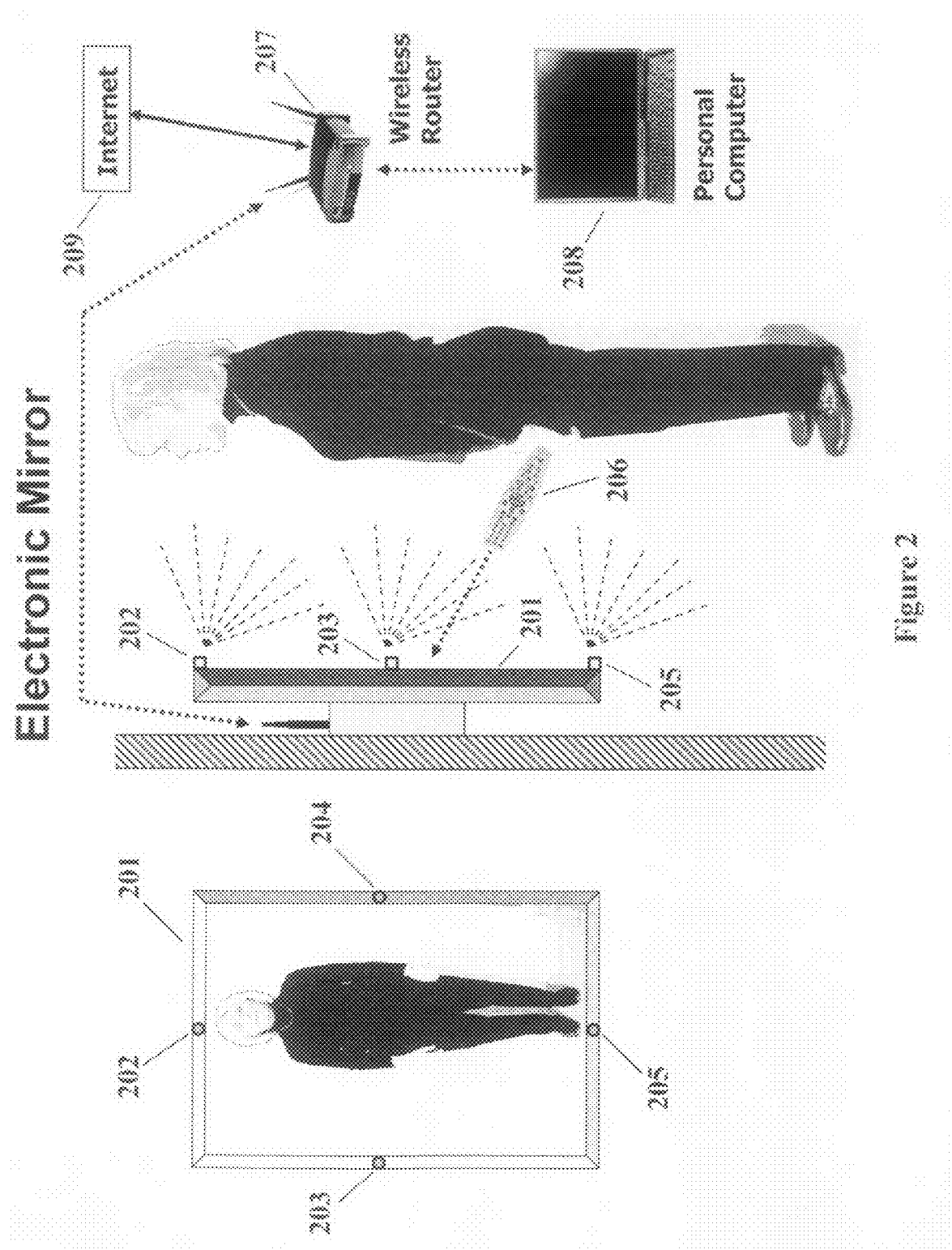
FIG. 2 shows both a profile and frontal view of a subject and an Electronic Mirror per this invention, including additional cameras whose images may be merged or concatenated, and where the Electronic Mirror communicates with a PC by way of a wireless router or access point.

As shown in FIG. 2, the Electronic Mirror 201 may contain more than one digital camera 202, 203, 204, and 205, whereby the cameras are used simultaneously and are coordinated in order to produce a wide-angle view without the distortion that sometimes results from the use of a wide-angle lens on a single camera. This coordination produces a composite image resulting from the merging or concatenation of multiple separate images. To accomplish this, only cameras 202 and 205 may be required, or alternately only cameras 203 and 204 may be required. However, the inclusion of all four cameras shown may further enhance the image in order to minimize unwanted wide-angle distortion. Alternately as will be shown later, cameras 203 and 204 may be useful when the Electronic Mirror is rotated 90° into landscape mode and used as a mirror in that mode as opposed to a TV. Images may be still images or full motion video images.

Handheld remote 206 is used not only to capture images and/or videos of the subject, it is also used to control the playback of images and videos as well as the storage and retrieval of images and videos such that any that have been recorded previously may be recalled and played or viewed in order to compare these images and videos with other outfit combinations. Although a handheld remote control is shown, remote control commands may be accomplished by way of voice commands along with voice recognition software residing in the Electronic Mirror.

Images may be stored within the Electronic Mirror system itself, or alternately the Electronic Mirror may communicate with a computer located on a local area network or on the Internet through either a wired or wireless connection. A wireless LAN scenario is shown in FIG. 2 whereby the Electronic Mirror 201 communicates with a wireless router 207 which in turn communicates with a personal computer 208 or the Internet 209. Software running on a processor within the Electronic Mirror enables images to be stored, regardless of where they are stored, for retrieval at a later time.

Figure 3:
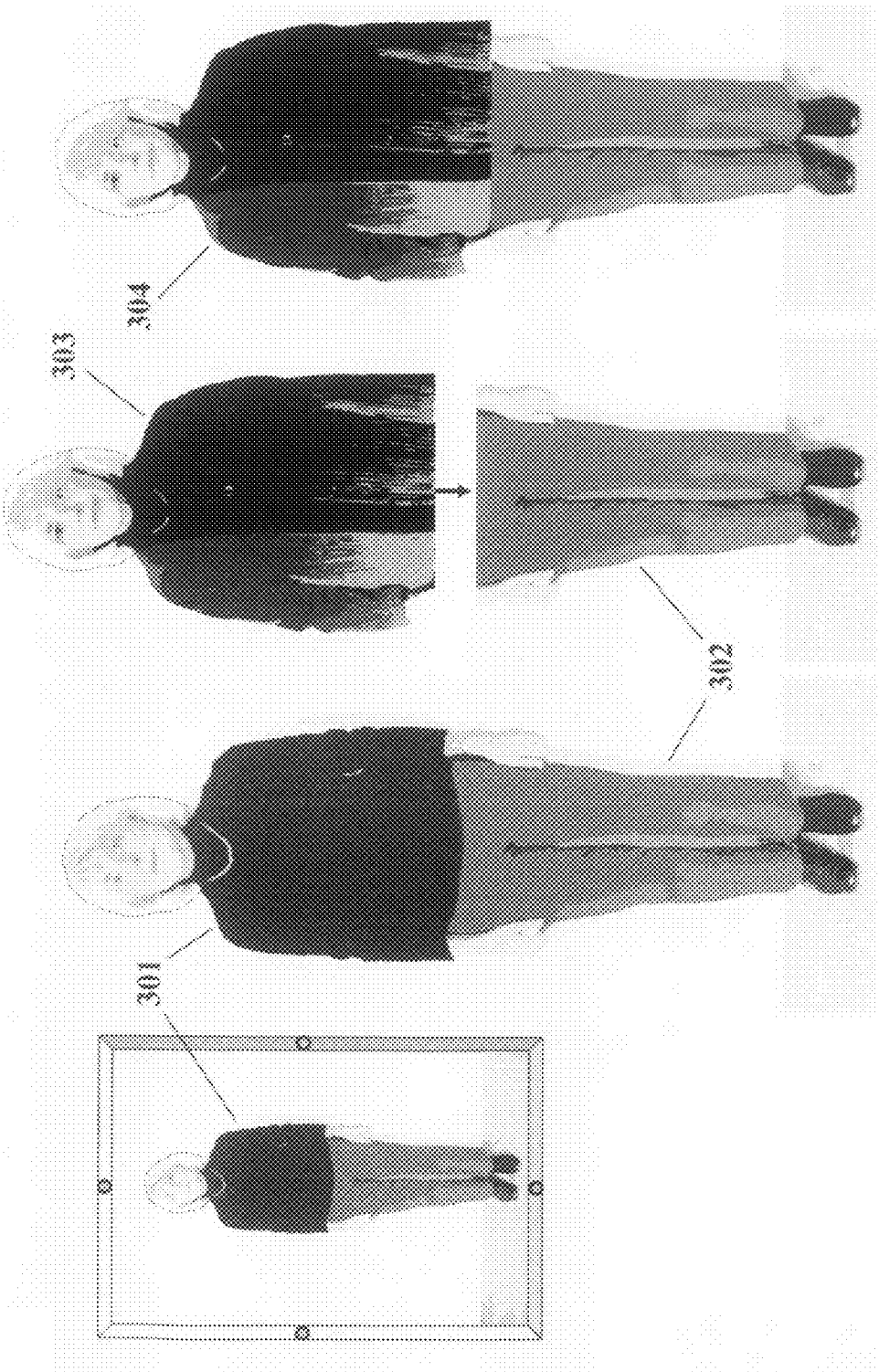
FIG. 3 shows a frontal view of a subject showing one example where a captured image of a subject is split such that a top-half image may later be combined with a bottom half image from a different outfit.

FIG. 3 shows an additional feature of this invention whereby the image of a person 301 may be split in some manner such that a portion of an outfit, for instance a pair of slacks 302 may be combined with a portion of another outfit, such as a sweater 303. In this way, a particular pair of slacks and sweater that were never actually simultaneously worn by the subject may be shown as a composite image 304 on the Electronic Mirror as if they were simultaneously being worn. This allows the subject to combine a wide variety of items without having to physically try all these items on simultaneously in the combinations they would like to view. All of this functionality can be controlled by remote control.

In order for the split image method described above to function with consistency, it is useful for the subject to stand in essentially the same position relative to the location of the Electronic Mirror. This is facilitated by placing marks on the floor where an individual will stand each time their image is captured. Alternately, the Electronic Mirror may issue voice commands to the user telling them how to move in order to be consistently positioned. To determine the position of the user, the Electronic Mirror may perform an image analysis on the image captured by the camera, or alternately may contain additional position sensing mechanisms such as sonar or radar. Captured images may also be electronically processed within the Electronic Mirror to align newly captured images with previously captured images in order to facilitate mixing portions of images as described above.

Figure 4:
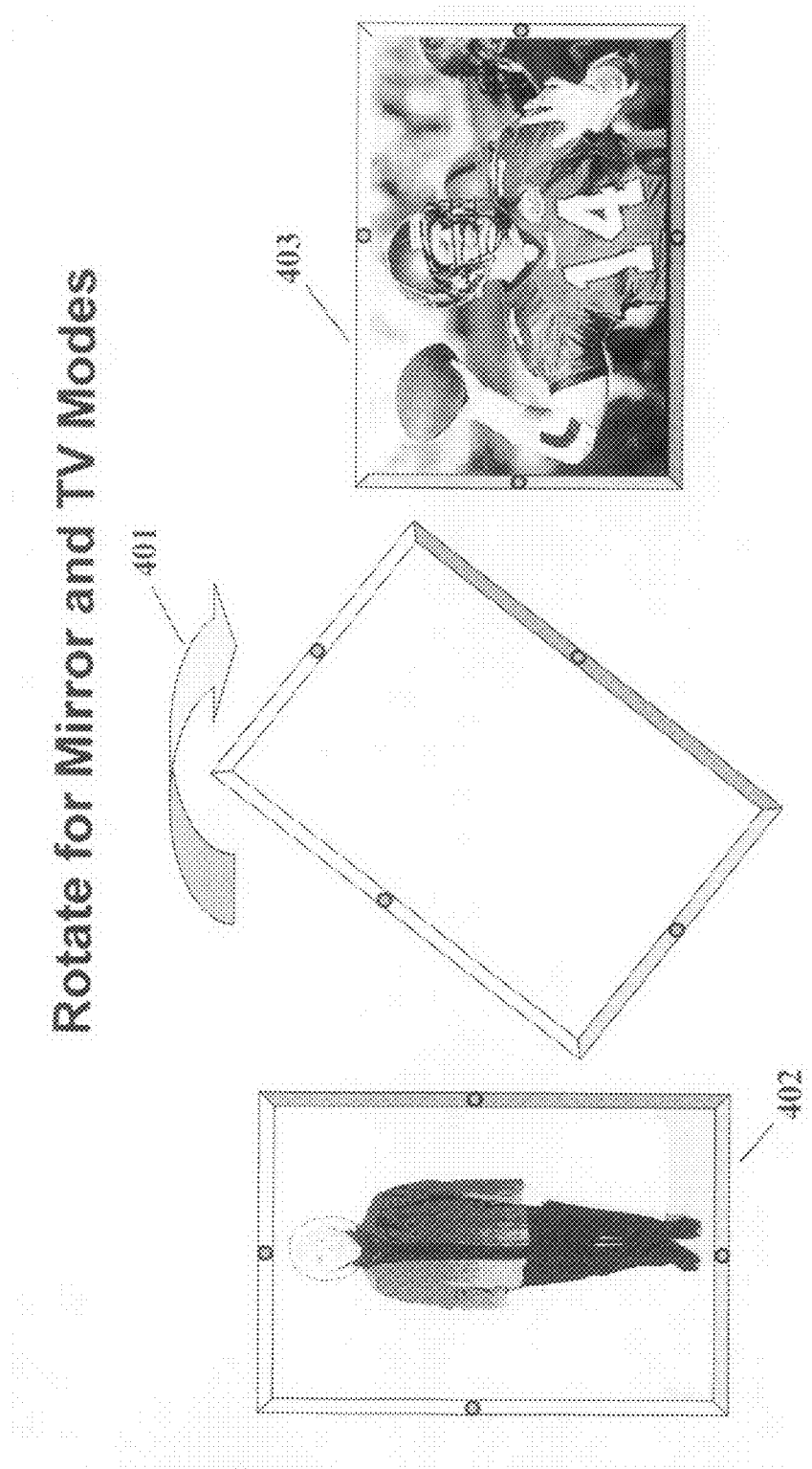
FIG. 4 shows how the flat panel monitor of the Electronic Mirror can be rotated 90 degrees from portrait to landscape mode. In portrait mode, the Electronic Mirror might function as a mirror, while in landscape mode, the Electronic Mirror might function as a conventional TV or video monitor, or alternately function as a landscape mode mirror—a function that would be useful if more than one subject wish to be viewed simultaneously.

FIG. 4 shows how the widescreen flat panel monitor display can be rotated 401, either manually or by a motorized mechanism which may or may not be activated by remote control. As shown, the flat panel monitor is used as a mirror per this invention when oriented in a portrait mode 402, and used as a conventional TV set for viewing broadcast TV programming when oriented in landscape mode 403. There may also be times when the user wishes to have an Electronic Mirror functionality in a landscape mode, potentially for viewing multiple people at the same time, and this mode of operation may also be supported.

The rotation of the monitor, if motorized, may be controlled by remote control, either from a handheld remote control or by way of voice commands. If a handheld remote control is utilized, it may use a wireless RF connection to facilitate ease of use when compared with an IR (infrared) remote that has a directional beam. If voice commands are utilized for control, a learning mode may be incorporated to adapt the speech recognition to a particular user or set of users.

The Electronic Mirror may include an integral TV tuner or satellite/cable receiver, or alternately may simply receive TV programming via video and audio inputs driven by a separate TV receiving device. Video and audio information received from a separate device may be received via conventional cables or via an RF wireless link.

Thus, the foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An electronic mirror comprising:
a flat panel monitor display;
at least one digital camera for capturing images of a subject;
a processor responsive to remote control commands for controlling the operation of the electronic mirror;
wherein the digital camera captures images of a subject and the flat panel monitor displays the captured images;
wherein captured images are stored for viewing at a later time;
wherein the flat panel monitor may be rotated 90 degrees to support both landscape and portrait viewing modes; and
wherein the flat panel monitor displays TV programming when oriented in landscape mode, and images captured by said digital camera when oriented in portrait mode.

2. An electronic mirror comprising:
a flat panel monitor display;
at least one digital camera for capturing images of a subject;
a processor responsive to remote control commands for controlling the operation of the electronic mirror;
at least one of an integral TV tuner, a satellite receiver, and a cable receiver;
wherein the digital camera captures images of a subject and the flat panel monitor displays the captured images;
wherein captured images are stored for viewing at a later time;
wherein the flat panel monitor may be rotated 90 degrees to support both landscape and portrait viewing modes; and
wherein the flat panel monitor displays TV programming when oriented in landscape mode, and images captured by said digital camera when oriented in portrait mode.

3. An electronic mirror comprising:
a flat panel monitor display;
at least one digital camera for capturing images of a subject;
a processor responsive to remote control commands for controlling the operation of the electronic mirror;
wherein the digital camera captures images of a subject and the flat panel monitor displays the captured images;
wherein the flat panel monitor may be rotated 90 degrees to support both landscape and portrait viewing modes; and
wherein the flat panel monitor displays TV programming when oriented in landscape mode, and images captured by said digital camera when oriented in portrait mode.

4. An electronic mirror comprising:
a flat panel monitor display;
at least one digital camera for capturing images of a subject;
a processor responsive to remote control commands for controlling the operation of the electronic mirror;
at least one of an integral TV tuner, a satellite receiver, and a cable receiver;
wherein the digital camera captures images of a subject and the flat panel monitor displays the captured images;
wherein the flat panel monitor may be rotated 90 degrees to support both landscape and portrait viewing modes; and
wherein the flat panel monitor displays TV programming when oriented in landscape mode, and images captured by said digital camera when oriented in portrait mode.

5. An electronic mirror comprising:
a flat panel monitor display capable of being rotated 90 degrees to support both landscape and portrait viewing modes;
at least one digital camera for capturing at least one of still and video images of a subject;
a processor responsive to remote control commands for controlling the operation of the electronic mirror;
wherein the digital camera captures images of a subject and the flat panel monitor displays the captured images; and
wherein the flat panel monitor displays images captured by said digital camera when oriented in portrait mode, and TV programming when oriented in landscape mode.

6. The electronic mirror of claim 5 wherein a first image captured by said digital camera is split into multiple portions, and where a portion of said first image is displayed along with a portion of a second image.

7. The electronic mirror of claim 5 wherein multiple digital cameras are utilized to capture video images of a subject, and wherein the images from the multiple cameras are merged or concatenated to produce a composite image with reduced wide-angle distortion.

* * * * *